(12) United States Patent
Li et al.

(10) Patent No.: US 12,493,110 B2
(45) Date of Patent: Dec. 9, 2025

(54) TIME-OF-FLIGHT BASED DISTANCE MEASURING METHOD AND RELATED DISTANCE MEASURING SYSTEM

(71) Applicant: SHENZHEN GOODIX TECHNOLOGY CO., LTD., Guangdong (CN)

(72) Inventors: Chung-Te Li, Guangdong (CN); Hao-Jen Wang, Guangdong (CN); Meng-Ta Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 1126 days.

(21) Appl. No.: 17/472,158

(22) Filed: Sep. 10, 2021

(65) Prior Publication Data
US 2021/0405166 A1 Dec. 30, 2021

Related U.S. Application Data

(63) Continuation of application No. PCT/CN2020/094918, filed on Jun. 8, 2020.

(51) Int. Cl.
G01S 7/48 (2006.01)
G01S 7/486 (2020.01)
G01S 7/4863 (2020.01)

(52) U.S. Cl.
CPC .......... *G01S 7/4868* (2013.01); *G01S 7/4863* (2013.01)

(58) Field of Classification Search
USPC ....................................................... 356/5.01
See application file for complete search history.

(56) References Cited

U.S. PATENT DOCUMENTS 7,372,276 B2 * 5/2008 Mulcahey ................ G01V 3/08
324/329
7,605,590 B2 * 10/2009 Mulcahey ................ G01V 3/06
324/67

(Continued)

FOREIGN PATENT DOCUMENTS

CN 101194183 A 6/2008
CN 102508259 A 6/2012

(Continued)

OTHER PUBLICATIONS

Chen, W., & Li, X. (2017). Exposure Evaluation Method Based on Histogram Statistics. Proceedings of the 2017 2nd International Conference on Electrical, Automation and Mechanical Engineering (EAME 2017). doi:10.2991/eame-17.2017.68.

(Continued)

*Primary Examiner* — James R Hulka
(74) *Attorney, Agent, or Firm* — WPAT, P.C.; Anthony King

(57) ABSTRACT

A time-of-flight distance measuring method and TOF distance measuring system. The distance measuring method includes: intermittently transmitting a plurality of pulses from a pulse generation unit; controlling a TOF sensor to allow each pixel of a plurality of pixels in the TOF sensor to continuously perform a first signal sampling first proportion for a first predetermined time on a first proportion of a plurality of reflected signals and performs a second signal sampling second proportion for a second predetermined time on a second proportion of a plurality of reflected signals, so as to generate a plurality of sampling results corresponding to the plurality of pixels; obtaining a plurality of depth information and a plurality of luminance information corresponding to the plurality of pixels according to the plurality of sampling results; and adjusting the first proportion (Continued)

and the second proportion according to the plurality of depth information and the plurality of luminance information.

16 Claims, 7 Drawing Sheets

(56) References Cited

U.S. PATENT DOCUMENTS

| | | | | |
|---|---|---|---|---|
| 10,746,874 | B2* | 8/2020 | Ohki | G01S 17/931 |
| 11,187,802 | B2* | 11/2021 | Pacala | G01S 17/10 |
| 11,454,712 | B2* | 9/2022 | Chueh | G01C 3/08 |
| 11,506,763 | B2* | 11/2022 | Dielacher | G01S 7/4865 |
| 11,828,850 | B2* | 11/2023 | Hung | G01S 17/894 |
| 12,181,576 | B2* | 12/2024 | Yang | H10F 39/803 |
| 12,181,578 | B2* | 12/2024 | Nagase | G01S 7/4863 |
| 2006/0181280 | A1* | 8/2006 | Mulcahey | G01V 3/165 324/326 |
| 2008/0111553 | A1* | 5/2008 | Mulcahey | G01V 3/06 324/326 |
| 2016/0259038 | A1 | 9/2016 | Retterath et al. | |
| 2017/0242126 | A1 | 8/2017 | Matsuo et al. | |
| 2018/0045513 | A1 | 2/2018 | Kitamura et al. | |
| 2018/0348369 | A1* | 12/2018 | Ohki | G01S 17/08 |
| 2019/0011562 | A1* | 1/2019 | Pacala | G06V 20/58 |
| 2020/0049803 | A1 | 2/2020 | Chueh | |
| 2020/0132819 | A1* | 4/2020 | Dielacher | G01S 17/36 |
| 2020/0158835 | A1* | 5/2020 | Yu | G01S 17/89 |
| 2021/0018623 | A1* | 1/2021 | Yang | G01S 17/36 |
| 2021/0080588 | A1* | 3/2021 | Hung | H04N 25/70 |
| 2021/0270968 | A1* | 9/2021 | Nagase | G01S 17/10 |

FOREIGN PATENT DOCUMENTS

| | | |
|---|---|---|
| CN | 107850668 A | 3/2018 |
| CN | 108445500 A | 8/2018 |
| CN | 109313264 A | 2/2019 |
| CN | 110168398 A | 8/2019 |
| CN | 110456380 A | 11/2019 |
| CN | 110574364 A | 12/2019 |
| CN | 110609293 A | 12/2019 |
| CN | 110988840 A | 4/2020 |
| CN | 110998365 A | 4/2020 |
| CN | 111108411 A | 5/2020 |
| CN | 111208528 A | 5/2020 |
| EP | 3647813 A1 | 5/2020 |
| JP | 2020008962 A1 | 1/2020 |
| WO | 2020008962 | 1/2020 |
| WO | WO-2021068156 A1 * | 4/2021 ............ G01S 17/08 |

OTHER PUBLICATIONS

English abstract translation of CN101194183A, CN102508259A, CN107850668A, CN108445500A, CN109313264A, CN110168398A, CN110456380A, CN110574364A, CN110609293A, CN110988840A, CN110998365A, CN111108411A, CN111208528A.
As-filed PCT Request of PCT/CN2020/094918.
As-filed PCT Application of PCT/CN2020/094918.
International Searching Authority (ISA) Form 202—Notification of Receipt of Search PCT/CN2020/094918.
International Searching Authority (ISA) Form 210—International Search Report of PCT/CN2020/094918.
International Searching Authority (ISA) Form 220—Notification of Transmittal of the International Search Report and the Written Opinion of the International Searching Authority, or the Declaration of PCT/CN2020/094918.
International Searching Authority (ISA) Form 237—Written Opinion of PCT/CN2020/094918.
Notification of the International Application number and of the International Filing Date—Form 105 of PCT/CN2020/094918.
Office Action of EP family patent Application No. 20923682.7, mailed on Feb. 11, 2025.

* cited by examiner

TIME-OF-FLIGHT BASED DISTANCE MEASURING METHOD AND RELATED DISTANCE MEASURING SYSTEM

CROSS-REFERENCE TO RELATED APPLICATIONS

This application is a continuation of International Application No. PCT/CN2020/094918, filed on Jun. 8, 2020, the disclosure of which is hereby incorporated by reference in its entirety.

TECHNICAL FIELD

The present application relates to distance measuring and depth sensing techniques, particularly a time-of-flight based distance measuring method and a related system.

BACKGROUND

In the tithe-of-flight (TOF) based distance measuring techniques, pulse modulation measures the distance of the target by the time difference between the transmission and reception of light pulses, which is a simple measurement mechanism. However, in high dynamic range (HDR) applications, there is still much room for improvement in the existing techniques for the issues of overexposure at close distances and insufficient signal level at long distances. Therefore, it has become one of the most important issues in the field to balance the signal level of near and far distances when performing TOE based distance measurement.

SUMMARY OF THE INVENTION

One embodiment of the present application discloses a time-of-flight (TOF) based distance measuring method, including: intermittently transmitting a plurality of pulses from a pulse generation unit, wherein the plurality of pulses are reflected by a target to generate a plurality of reflected signals; controlling a TOF sensor to allow each pixel of a plurality of pixels in the TOF sensor to continuously perform a first signal sampling for a first predetermined time on a first proportion of the plurality of reflected signals and perform a second signal sampling for a second predetermined time on a second proportion of the plurality of reflected signals, so as to generate a plurality of sampling results corresponding to the plurality of pixels, wherein a starting time point of the first predetermined time and a transmitting time point of the corresponding pulse have a first time difference, and a starting time point of the second predetermined time and a transmitting time point of the corresponding pulse have a second time difference, wherein the first time difference is smaller than the second time difference, the first signal sampling corresponds to a first depth range, and the second signal sampling corresponds to second depth range; obtaining a plurality of depth information and a plurality of luminance information corresponding to the plurality of pixels according to the plurality of sampling results; and adjusting the first proportion and the second proportion according to the plurality of depth information and the plurality of luminance information.

Another embodiment of the present application discloses a time-of-flight (TOF) based distance measuring system, including: a pulse generation unit; a control circuit, coupled to the pulse generation unit and configured to control the pulse generation unit to intermittently transmit a plurality of pulses and adjust a first proportion and a second proportion according to a plurality of depth information and a plurality of luminance information, wherein the plurality of pulses are reflected by a target to generate a plurality of reflected signals; and a TOF sensor, including a pixel array having a plurality of pixels, wherein the TOF sensor is under the control of the control circuit and configured to control each pixel of a plurality of pixels to perform a first signal sampling for a first predetermined time on a first proportion of the plurality of reflected signals and perform a second signal sampling for a second predetermined time on a second proportion of the plurality of reflected signals, so as to generate a plurality of sampling results corresponding to the plurality of pixels, wherein a starting time point of the first predetermined time and a transmitting time point of the corresponding pulse have a first time difference, and a starting time point of the second predetermined time and a transmitting time point of the corresponding pulse have a second time difference, wherein the first time difference is smaller than the second time difference, the first signal sampling corresponds to a first depth range, the second signal sampling corresponds to second depth range, and the TOF sensor obtains a plurality of depth information and a plurality of luminance information corresponding to the plurality of pixels according to the plurality of sampling results.

The TOF based distance measuring method and related distance measuring system disclosed in the present application can improve the effectiveness of high dynamic range sampling by respectively adjusting the ratio of signal samples taken at different distances in considering of both the depth information and the luminance information.

DETAILED DESCRIPTION

Figure 1:
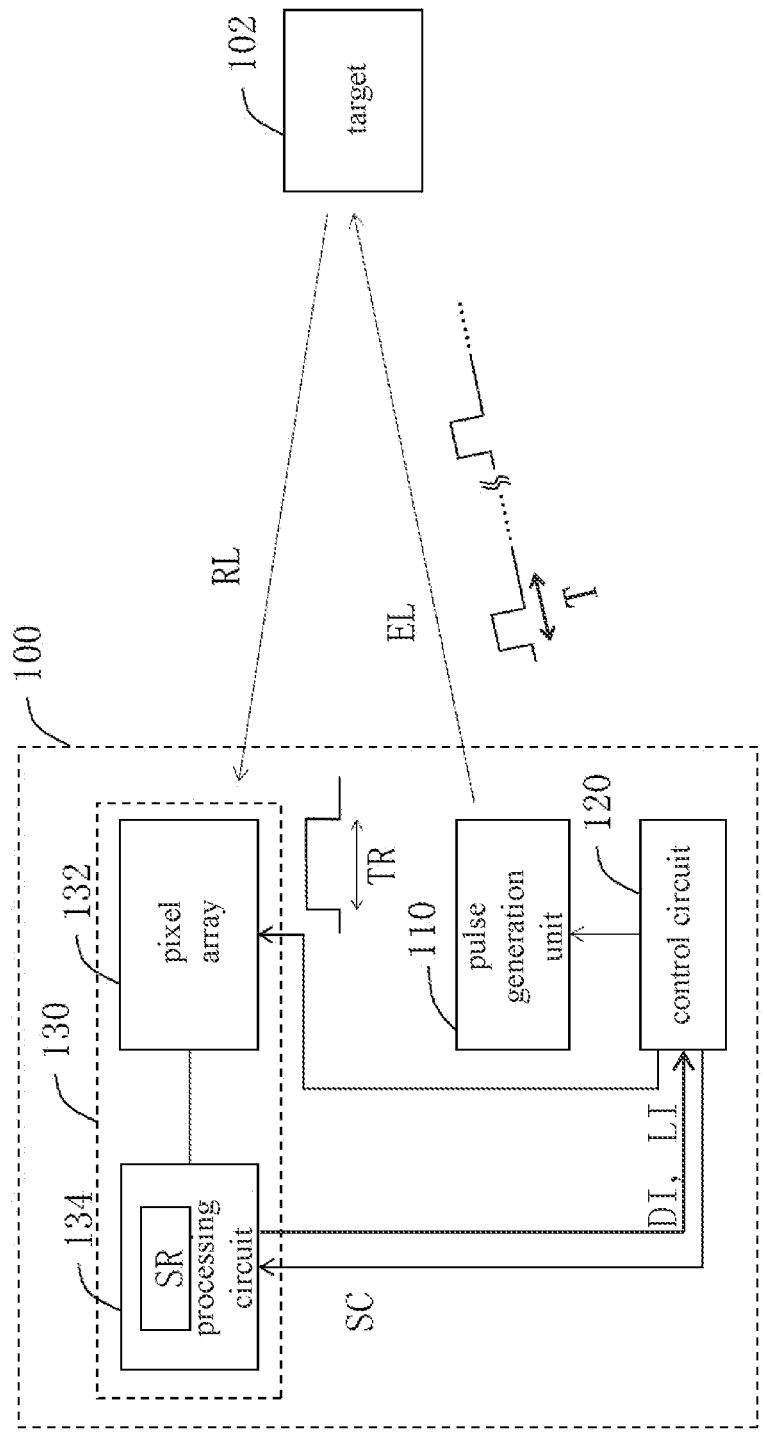
FIG. 1 is a functional block diagram illustrating a TOF based distance measuring system according to one embodiment of the present application.

The following disclosure provides many different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

Embodiments of the present application are able to adjust the ratio of signal samples taken at different distances separately by considering the depth information and luminance information when performing TOF based distance measurement, in order to avoid the problem of overexposure or underexposure caused by blind configuration.

FIG. 1 is a functional block diagram illustrating a TOF based distance measuring system according to one embodiment of the present application. The distance measuring system 100 is configured to detect the distance between a target 102 and the distance measuring system 100. It should be noted that the distance between the target 102 and the distance measuring system 100 should be is smaller than or equal to maximum detectable distance of the distance measuring system 100. For example (however, the present application is not limited thereto), the distance measuring system 100 can be a 3D imaging system or a depth sensing system, which can utilize the time-of-flight technique to measure the distance or depth of the surrounding target, thereby obtaining a depth of field and 3D image information.

It should be noted that, the distance measuring system 100 can be implemented as various types of TOF based distance measuring systems, such as a TOF based optical distance measuring system. TOF based acoustic distance measuring system, TOF based radar distance measuring system, or other types of distance measuring system. For the sake of brevity, in the following embodiments, the distance measuring system 100 is implemented as an optical distance measuring system to discuss the TOE distance measuring solution of the present application. However, persons having ordinary skill in the art should understand that the TOF distance measuring solution of the present application can be applied in any TOF based distance measuring systems.

The distance measuring system 100 can include (but is not limited to) a pulse generation unit 110, a control circuit 120, and a TOF sensor 130. The pulse generation unit 110 is configured to intermittently transmit pulses having a pulse length T. After one pulse is transmitted, the pulse generation unit 110 would stop transmitting the pulse for a period of time, and this period can be much longer than or longer than the pulse length T. The pulse generation unit 110 can transmit a pulse until it is activated again.

In the present application, the distance measuring system 100 can be a TOF based optical distance measuring system, and hence, the pulse generation unit 110 can be implemented as a light pulse generation unit to generate a pulsed light signal EL. In the first approach of the present application, the pulsed light signal EL can be a single light pulse that is generated intermittently. That is, the light pulse generation unit can intermittently transmit the single light pulse, which is used a single pulse intermittently generated by the pulse generation unit 110. For example, the pulse generation unit 110 can include (but is not limited to) a driving circuit and a light-emitting unit (not shown in FIG. 1). The driving circuit is configured to drive the light-emitting unit, so that the light-emitting unit intermittently generate the single light pulse. The light-emitting unit can be (but is not limited to) a semiconductor laser (also referred to as a laser diode (LD)), a light-emitting diode (LED), or other light-emitting units capable of generating light pulses, wherein the light pulse generated by the semiconductor laser is coherent light, whereas the light pulse generated by the light-emitting is incoherent light.

It should be noted that, the pulse generation unit 110 can generate other types of pulses, such as, an acoustic pulse or electromagnetic pulse. For example, in the embodiment where the distance measuring system 100 is implemented as an acoustic distance measuring system, the pulse generation unit 110 can be implemented as an acoustic pulse generation device. The acoustic pulse generation device is configured to intermittently transmit the single acoustic pulse (e.g., ultrasonic acoustic pulse) as the single pulse intermittently generated by the pulse generation unit 110. In another example, in the embodiment where the distance measuring system 100 is implemented as radar distance measuring system, the pulse generation unit 110 can be implemented as an electromagnetic pulse generation device. The electromagnetic pulse generation device is configured to intermittently transmit the single electromagnetic pulse as the single pulse intermittently generated by the pulse generation unit 110.

The control circuit 120 is coupled to the pulse generation unit 110 and configured to control the pulse generation unit 110 to generate the pulsed light signal EL. For example, the control circuit 120 can control the pulse generation unit 110 to intermittently transmit the single light pulse. In another example, the control circuit 120 can control the driving circuit included in the pulse generation unit 110, so that the driving circuit drives the light-emitting unit included in the pulse generation unit 110 to intermittently transmit the single light pulse. The TOF sensor 130 is controlled by the control circuit 120 and configured to sample a reflected signal RL, so as to detect the distance between the distance measuring system 100 (or the TOF sensor 130) and the target 102, wherein the reflected signal RL is generated as a result of the pulsed light signal EL being reflected by the target 102. In another embodiment, the control circuit 120 can be the main control unit in the terminal device and need not to be included in the distance measuring system 100.

In the present application, the TOF sensor 130 continuously performs multiple times of signal sampling during an adjustable predetermined time TR (for ease of illustration, shown as the waveform having a time length labeled as TR) according to a sampling time interval, so as to generate a sampling result of the reflected signal other words, the reflected signal RL arriving at the TOF sensor 130 during the predetermined time TR can be sensed, Generally, since the reflected signals RL reflected from a near side and a far side have different arrival times, to improve the dynamic range, it is a general practice to set the predetermined time TR as greater than or equal to the pulse length T (for example, greater than or equal to a certain fold of the pulse length T), so that both the reflected signals RL reflected from the near side and the far side will be captured; however, the drawback of this approach is that the amount of information received from the near side is often much more than the amount of information received from the far side, causing the amount of information from the far side to be easily affected by the background light, triggering shot noise. Therefore, the predetermined time TR in this application is adjustable, and its details are described later.

After performing multiple times of signal sampling to generate the sampling results, the TOF sensor 130 can calculate a phase shift between the reflected signal RL and the pulsed light signal EL transmitted by the pulse generation unit 110 according to the sampling result. For example, the TOF sensor 130 can include (but is not limited to) a pixel array 132 and a processing circuit 134. The pixel array 132 includes a plurality of pixels, each pixel can include a photo sensor to generate a photo response signal according to the reflected signal RL. The control circuit 120 can cause the photo sensor of each pixel to selectively output the photo response signal corresponding to each pixel to the processing circuit 134. The photo sensor can be a photodiode.

During the predetermined time TR, the processing circuit 134 can perform one sampling to the photo response signal outputted by each pixel at the sampling time interval according to a sampling control signal SC, and generate a sampling result SR accordingly, wherein the sampling control signal SC can be generated by the control circuit 120. Next, the processing circuit 134 can perform a signal process to the sampling result SR; for example, the signal process can be a mixed frequency processing and discrete Fourier transform, so as to calculate the amplitude (i.e., the luminance information LI) of the reflected signal RL received by each pixel, and a phase shift between the reflected signal RL received by each pixel and the pulsed light signal EL transmitted by the pulse generation unit 110, thereby detecting the TOF of the pulsed light signal EL and calculating the distance (i.e., the depth information DI) between the target 102 and the reference position according to TOF, and then transmit the luminance information LI and depth information DI to the control circuit 120, so that the control circuit 120 can control the pulse generation unit 110 and pixel array 32 accordingly, details of which are discussed below. The reference position can be a (but is not limited to) position of the distance measuring system 100.

Figure 2:
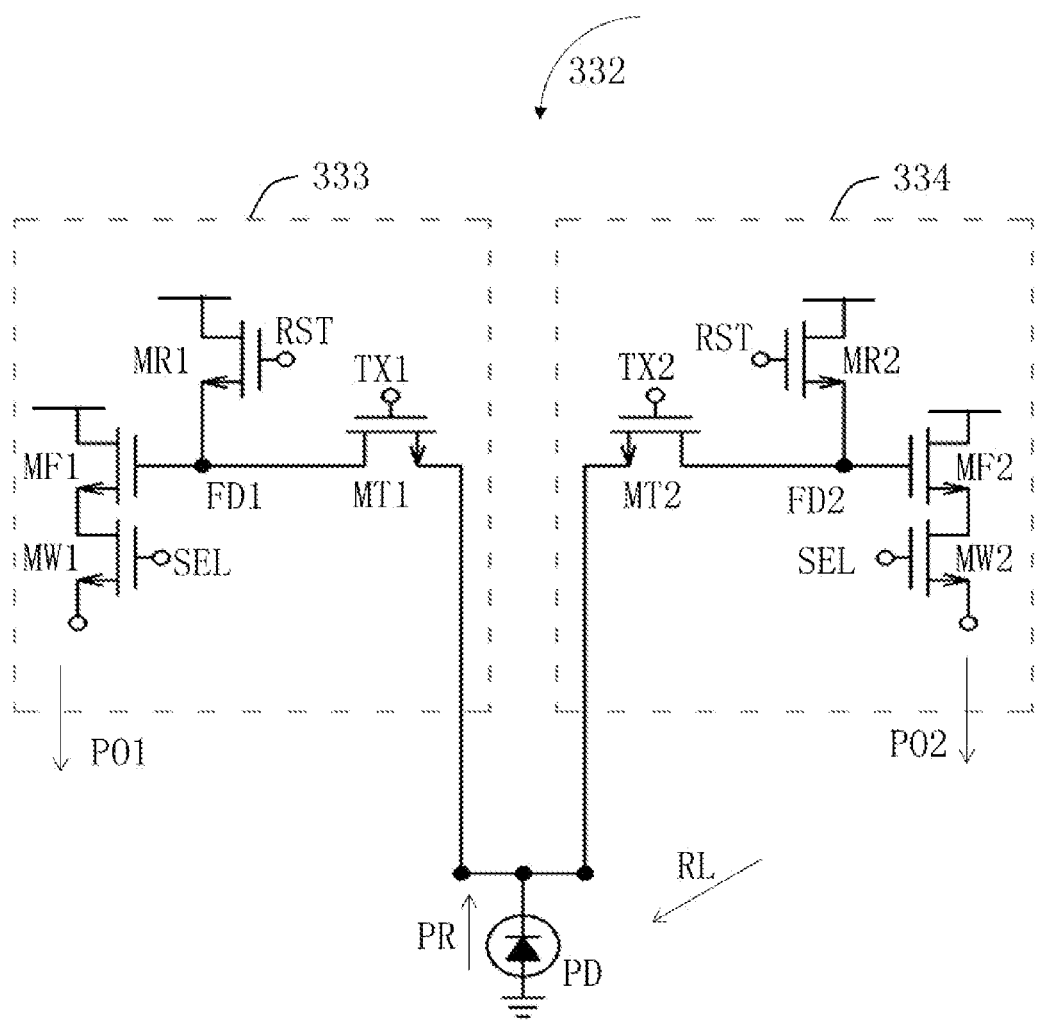
FIG. 2 is a schematic diagram illustrating the circuit structure of a single pixel on the pixel array of the TOF distance measuring system shown in FIG. 1, according to one embodiment.

For the ease of discussion, an embodiment of a pixel circuit is used below to discuss the TOF distance measuring solution according to the present application. However, the present application is not limited thereto. FIG. 2 is a schematic diagram illustrating the circuit structure of a single pixel on the pixel array 132 of the TOF distance measuring system shown in FIG. 1, according to one embodiment of the present application. Reference is made to both FIG. 1 and FIG. 2. In the present embodiment, the pixel 332 includes (but is not limited to) a photo sensor PD, a first readout circuit (e.g., a photoelectric readout circuit) 333, and a second readout circuit (e.g., a photoelectric readout circuit) 334. The photo sensor PD (e.g., photodiode) is configured to perform a light sensing operation. For example, the photo sensor PD can sense the reflected signal RL to correspondingly generate a photo response signal PR, wherein the photo response signal PR can be outputted through at least one readout circuit of the first readout circuit 333 and the second readout circuit 334. In some embodiments, the photo sensor PD can convert the received light signal into the photocurrent signal having a corresponding magnitude; that is, the photo response signal PR may be a current signal characterizing the magnitude of the light signal, and the first readout circuit 333/second readout circuit 334 is used to read out said photocurrent signal.

The first readout circuit 333 can selectively transmit the photo response signal PR generated by the photo sensor PD according to a first control signal TX1 to generate a first pixel output PO1, wherein the first control signal TX1 can be provided by the control circuit 120. That is, the pixel 332 can selectively transmits the photo response signal PR to the processing circuit 130 through the first readout circuit according to the first control signal TX1, so as to generate the first pixel output PO1 and output the same to the processing circuit 130. The second readout circuit 334 can selectively transmit the photo response signal PR generated by the photo sensor PD according to a second control signal TX2 to generate a second pixel output PO2, wherein the second control signal TX2 can be provided by the control circuit 120 and has a phase different from the phase of the first control signal TX1. In one particular embodiment, the phase difference between TX1 and TX2 is 180°. The pixel 332 can selectively transmit the photo response signal PR to the processing circuit 130 through the second readout circuit according to the second control signal TX2, so as to generate the second pixel output PO2 and output the same to the processing circuit 130. In the present embodiment, the first control signal TX1 and the second control signal TX2 can be provided by the control circuit 120 of FIG. 1.

In the present embodiment, the first readout circuit 333 can include (but is not limited to) a first reset transistor MR1, a first transmit transistor MT1, a first output transistor MF1, and a first readout transistor MW1. The second readout circuit 334 includes (but is not limited to) a second reset transistor MR2, a second transmit transistor MT2, a second output transistor MF2, and a second readout transistor MW2. The first reset transistor MR1 and the second reset transistor respectively reset a first floating diffusion node FD1 and a second floating diffusion node FD2 according to a reset signal RST, wherein the reset signal RST can be provided by the control circuit 120. The first transmit transistor MT1 and the second transmit transistor MT2 are both coupled to the photo sensor PD and are respectively conducted according to the first control signal TX1 and the second control signal TX2. That is, the first transmit transistor MT1 and the second transmit transistor MT2 are respectively under the control of the first control signal TX1 and the second control signal TX2, so as to connect or disconnect the photo sensor PD. The first output transistor MF1 and the first output transistor MF2 are respectively configured to amplify the voltage signal of the first floating diffusion node FD1 and the second floating diffusion node FD2, so as to respectively generate a first pixel output PO1 and a second pixel output PO2. The First readout transistor MW1 and the second readout transistor MW2 selectively outputs the first pixel output PO1 and the second pixel output PO2, respectively, according to a selection signal SEL, wherein the selection signal SEL can be provided by the control circuit 120.

Figure 3:
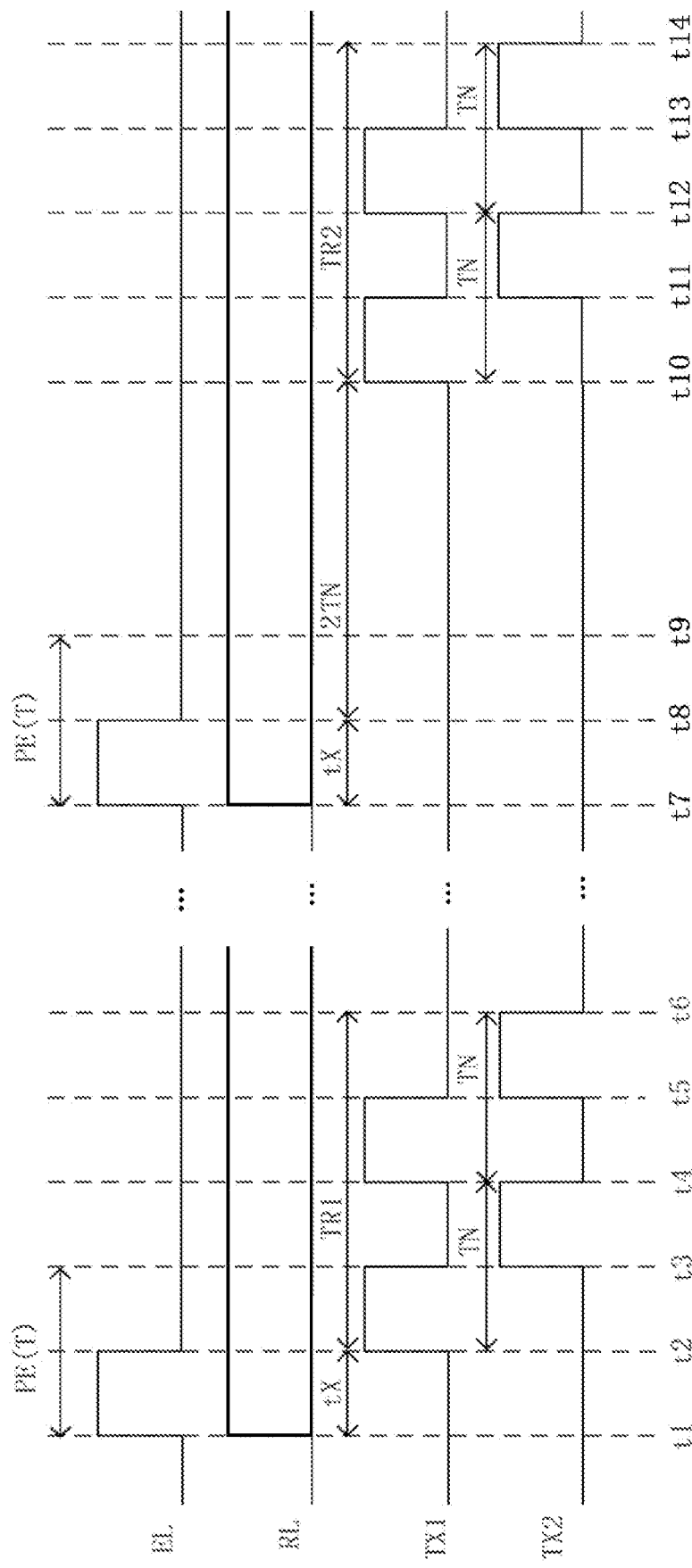
FIG. 3 is a schematic diagram illustrating the signal timing of the pixel shown in FIG. 2, according to one embodiment of the present application.

Reference is made to FIG. 1, FIG. 2, and FIG. 3. FIG. 3 is a schematic diagram illustrating the signal timing of the pixel 332 shown in FIG. 2, according to one embodiment of the present application. In FIG. 3, the pulse generation unit 110 transmits a total of two pulses PE, and correspondingly, the sensor 130 performs two sampling, wherein the two samplings are carried out in substantially the same way but at different time points, so that the previous sampling is performed to the proportion of the reflected signal RL that reaches the sensor 130 sooner, and the subsequent sampling is performed to the proportion of the reflected signal RL that reaches the sensor 130 later.

Further, regarding the first pulse PE, the first pulse PE is transmitted at the time point t1 and then reflected to become the reflected signal RL; since the reflected signal RL contain the energy reflected by the first pulse PE from different depth, the energy reflected from the near side arrives at the pixel 332 sooner than the energy reflected from the far side. That is, in theory, any time point after the time point t1 may contain the energy of the reflected signal RL of the first pulse PE (referring to FIG. 3 for the label of the reflected signal RL after the time point t1). Generally, in the high dynamic range application, the length of the predetermined time TR of each sampling can be increased so that the level of the sampled information corresponds to a wider depth range; however, in the sampled information, the information reflected from the far side is much lesser than the information reflected from the near side, and hence, the information reflected from the far side tends to be interfered by noise.

In the present embodiment, different target depth range samplings are performed to different pulses PE. For example, for the first pulse PE in FIG. 3, the control circuit 120 controls the sensor 130 to perform a first signal sampling during the duration of the predetermined time TR1; for the second pulse PE in FIG. 3, the control circuit 120 controls the sensor 130 to perform a second signal sampling during the duration of the predetermined time TR2. In the present embodiment, the predetermined time TR1 is later than the transmission time of the first pulse PE by a first time difference tX, the predetermined time TR2 is later than the transmission time of the second pulse PE by a first time difference tX+2TN, and the length of the predetermined time TR1 is the same as that of the predetermined time TR2. Hence, during the predetermined time TR1, the first signal sampling can sample the energy of the first pulse PE that is reflected from a closer location to the sensor 130; and during the predetermined time TR2, the second signal sampling can sample the energy of the second pulse PE that is reflected from a farther location to the sensor 130, wherein the target sampling depths of the two are different and do not overlap.

In the present embodiment, multiple pulses PE (e.g., thousands) are transmitted, and the first signal sampling or the second signal sampling is performed according to the predetermined time TR1 or the predetermined time TR2. Specifically, multiple pulses PE of a first proportion of the pulses PE may correspond to the first signal sampling, and multiple pulses PE of a second proportion of the pulses PE may correspond to the second signal sampling. For example, one may control the number of the pulse PE according to the first proportion and the second proportion, such that the number of pulses PE corresponding to the first signal sampling is less than the number of pulses PE corresponding to the second signal sampling, so as to balance the energy from the near side and the far side, so that the energy from the near side is not overexposed and the energy from the far side is pulled up. By way of example, 80% of the pulse PE corresponds to said second signal sampling and is used to sample the information at the far side; and the remaining 20% of the pulse PE corresponds to said first signal sampling and is used to sample the information at the near side. Said first proportion and the second proportion can be adjusted separately and independently; the details of their adjustment will be described later.

In FIG. 3, the first time difference tX is set as, for example, half of the pulse length T, but the present application is not limited thereto. The difference between the first time difference and the second time difference can be greater than or is smaller than two sampling periods TN, but should not be smaller than one sampling period TN. The predetermined time TR1 can include two sampling periods TN (that is, the time point t2 to the time point t4, and the time point t4 to the time point t6); the predetermined time TR2 can include two sampling periods TN (that is, the time point t10 to the time point t12 and the time point t12 to the time point t14), wherein the time length of each sampling period TN is equal to the pulse length T. The first control signal TX1 has the same waveform during each sampling period TN; the second control signal TX2 TX1 has the same waveform during each sampling period TN. The phase difference between the second control signal TX2 and the first control signal TX1 is 180 degrees.

Figure 4:
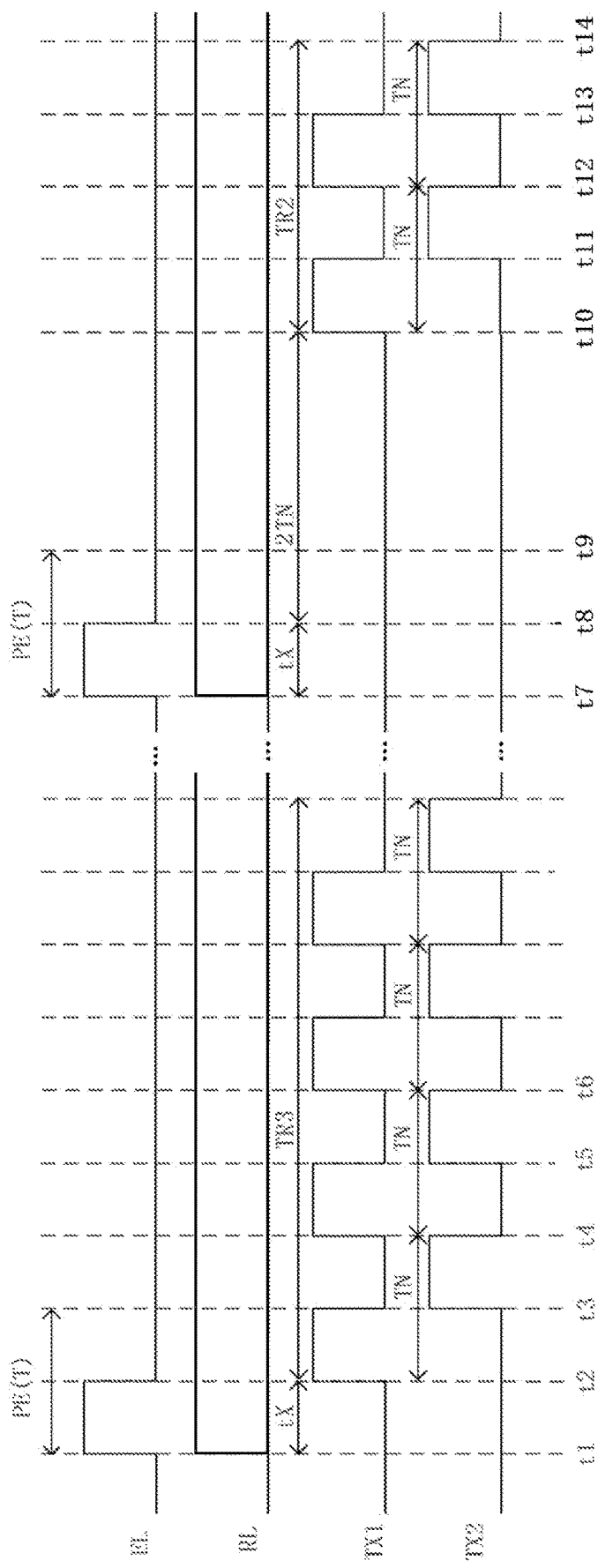
FIG. 4 is a schematic diagram illustrating the signal timing of the pixel shown in FIG. 2, according to another embodiment of the present application.

In certain embodiments, the length of the predetermined time can be adjusted according to the desired dynamic range, and target depth ranges related to different types of signal sampling may overlap with each other. Referring to FIG. 4, in which the predetermined time TR3 is for use in a third signal sampling, wherein the predetermined time TR3 can include 4 sampling periods TN. For example, the predetermined time TR3 starts from the time point t2 and lasts for 4 sampling periods TN. In this way, the predetermined time TR3 can simultaneously cover the dynamic ranges related to the predetermined time TR1 and the predetermined time TR2. In other words, the target depth range of the third signal sampling is the set of the first signal sampling and the second signal sampling. Thus, it is possible to make multiple pulse PEs correspond to different types of signal sampling arbitrarily according to the dynamic range requirements, and there is no limit to the number of types of signal sampling. For example, in some embodiments it, is possible to make 15% of pulses PE correspond to said third signal sampling and 85% of pulses PE correspond to said second signal sampling according to said first proportion and said second proportion; since the target depth range of said third signal sampling fully encompasses said first signal sampling and said second signal sampling, it is substantially equivalent to making 15% of the pulses PE correspond to said first signal sampling and 100% of the pulses PIE correspond to said second signal sampling; or to making 10% of the pulses PE correspond to said first signal sampling, 10% of the pulses PE correspond to said third signal sampling, and 80% of the pulses PE correspond to said second signal sampling, which is substantially equivalent to making 20% of the pulses PE correspond to said first signal sampling and 90% of the pulses PE correspond to said second signal sampling.

Further, the output of each pixel is sampled at the sampling period in each sampling period TN, where the sampling period may be one-fourth of the pulse length T. However, the present application is not limited to this, and the sampling period may also be one-eighth or one-sixteenth of the pulse length T.

As previously mentioned, the first signal sampling in FIG. 3 may sample the energy of the first pulse PIE reflected back to the sensor 130 from a nearer side during a predetermined time TR1; and the second signal sampling may sample the energy of the second pulse PE reflected back to the sensor 130 from a farther side during a predetermined time TR2, both with different and non-overlapping target sampling depths. In other words, said first signal sampling corresponds to a first depth range, for example a depth range of 5 to 10 meters from the distance measuring system 100; and the second signal sampling corresponds to a second depth range; for example, a depth range of 10 to 20 meters from the distance measuring system 100.

When the distance measuring system 100 has not yet learned any information about the scene in which the distance measuring is to be performed, it first uses a preset first proportion and a second proportion for the first signal sampling and the second signal sampling. For example, the preset first and second proportions may be set based solely on the depth range, such that if, for example, the first signal sampling is for a close distance and the second signal sampling is for a long distance, the preset first and second proportions will give more weight to the second signal sampling. But to be precise, such a configuration is not necessarily correct, for example in scenes where it is desired to perform distance measuring, objects at a distance have a very high luminance, while objects at a close distance have a very low luminance instead.

Therefore, after the first signal sampling and the second signal sampling are performed using the preset first proportion and second proportion, the processing circuit 134 obtains the sampling result of each pixel from the pixel array 132 and calculates the value of each pixel. The depth information DI and the luminance information LI are transmitted to the control circuit 120, and the control circuit 120 can adjust the first proportion and the second proportion according to the depth information DI and the luminance information LI. Specifically, the control circuit 120 classifies each pixel into a first pixel and a second pixel according to the depth information DI of each pixel, corresponding to the first depth range or the second depth range, respectively. In other words, pixels with depth information DI falling in the first depth range will be classified as the first pixel; pixels with depth information DI falling in the second depth range will be classified as the second pixel. In addition, the control circuit classifies the luminance information LI carried by the first pixel as first luminance information and classifies the luminance information LI carried by the second pixel as second luminance information.

Assuming that all pixels belong to the first pixel, the first proportion can be adjusted to the highest, that is, the second signal sampling can be completely ignored. Conversely, if all pixels belong to the second pixel, the second proportion is adjusted to the highest.

Figure 5:
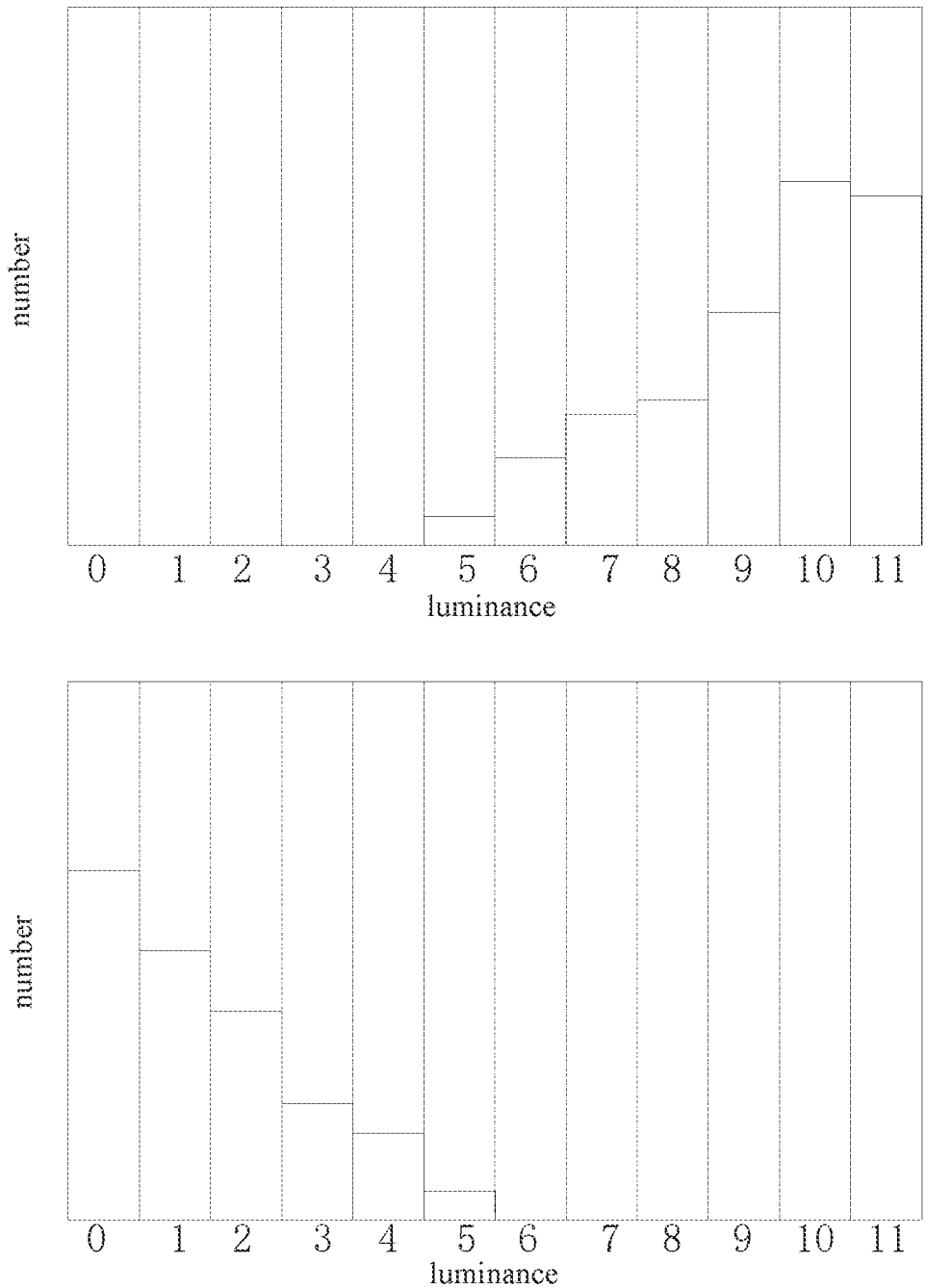
FIG. 5 is a histogram of the distribution of the plurality of first pixels at luminance 0 to 11 and the distribution of the plurality of second pixels at luminance 0 to 11 before adjusting the first proportion and the second proportion.

Assuming that there are a plurality of the first pixels and a plurality of the second pixels, the control circuit 120 will determine whether to emphasize or reduce the proportion of the first signal sample according to the luminance information LI of each first pixel and determine whether to emphasize or reduce the proportion of the second pixel according to the luminance information LI of each second pixel. In this embodiment, the control circuit 120 counts the luminance information LI of each first pixel, for example, each first pixel is set to correspond to one of a predetermined plurality of luminance intervals according to the luminance information LI of each first pixel, as shown at the top of FIG. 5, there are 12 consecutive and non-overlapping intervals representing luminance 0 to 11; then the number of first pixels corresponding to each interval is counted according to the luminance information LI of each first pixel. Similarly, the lower part of FIG. 5 represents the statistical histogram of the luminance information LI of each second pixel.

Table 1 shows the number of distribution of the plurality of first pixels at luminance 0 to 11, and Table 2 shows the number of distribution of the plurality of second pixels at luminance 0 to 11.

TABLE 1

| Luminance | 0 | 1 | 2 | 3 | 4 | 5 | 6 | 7 | 8 | 9 | 10 | 11 |
|---|---|---|---|---|---|---|---|---|---|---|---|---|
| Number | 0 | 0 | 0 | 0 | 0 | 15 | 40 | 50 | 55 | 80 | 120 | 110 |

TABLE 2

| Luminance | 0 | 1 | 2 | 3 | 4 | 5 | 6 | 7 | 8 | 9 | 10 | 11 |
|---|---|---|---|---|---|---|---|---|---|---|---|---|
| Number | 110 | 90 | 75 | 45 | 40 | 15 | 0 | 0 | 0 | 0 | 0 | 0 |

The statistical histogram of the luminance information LI of each first pixel according to Table 1 and the upper part in FIG. 5 shows that the first signal sampling according to the preset first and second proportions has a tendency to overexpose, i.e., the proportion of pixels with high luminance is too high; while the statistical histogram of the luminance information LI of each second pixel according to Table II and the lower part in FIG. 5 shows that the second signal sampling according to the preset first and second ratios has a tendency to underexpose (too dark), i.e., the proportion of pixels with low luminance is too high.

The control circuit 120 may set a number of predetermined reference values to be used as a basis for determining whether the first proportion and the second proportion are to be adjusted. For example, when the proportion of the plurality of first luminance information exceeding the first threshold value is higher than a first default value (e.g. 10% of the total number), the first proportion is reduced; when the proportion of the plurality of second luminance information exceeding the first threshold value is higher than the first default value, the second proportion is reduced; when the proportion of the plurality of first luminance information below the second threshold value is higher than said second default value, said first proportion is increased; and when the proportion of the plurality of second luminance information below the second threshold value is higher than the second default value, the second proportion is increased.

Therefore, assuming that the first threshold is luminance 9 and the second threshold is luminance 2, and that the first and second default values are both 10% of the total number of pixels, the control circuit 120 determines that the number of first pixels exceeding luminance 9 is 230, or about 49% of the total number of pixels 470, according to Table 1, and therefore the control circuit 120 determines that the first proportion needs to be reduced; and that the number of first pixels below luminance 2 is 200, or about 53% of the total number of pixels 375, according to Table 2, and therefore the control circuit 120 determines that the second proportion needs to be increased.

In some embodiments, the control circuit 120 may also use other mechanisms to calculate the statistical values in Tables 1 and 2 to determine how to adjust the first and second proportions. For example, it may also directly calculate the average luminance of all pixels and reduce the corresponding signal sampling proportion if it is above the third threshold value or increase the corresponding signal sampling proportion if it is below the fourth threshold value.

Therefore, assuming that the third threshold value is luminance 8 and the second threshold value is luminance 1 and the average luminance of 470 pixels is 9 according to Table 3, then the control circuit 120 determines that the first proportion needs to be reduced; assuming that the average luminance of 470 pixels is 1.6 according to Table 2, then the control circuit 120 determines that the second proportion needs to be increased.

Figure 6:
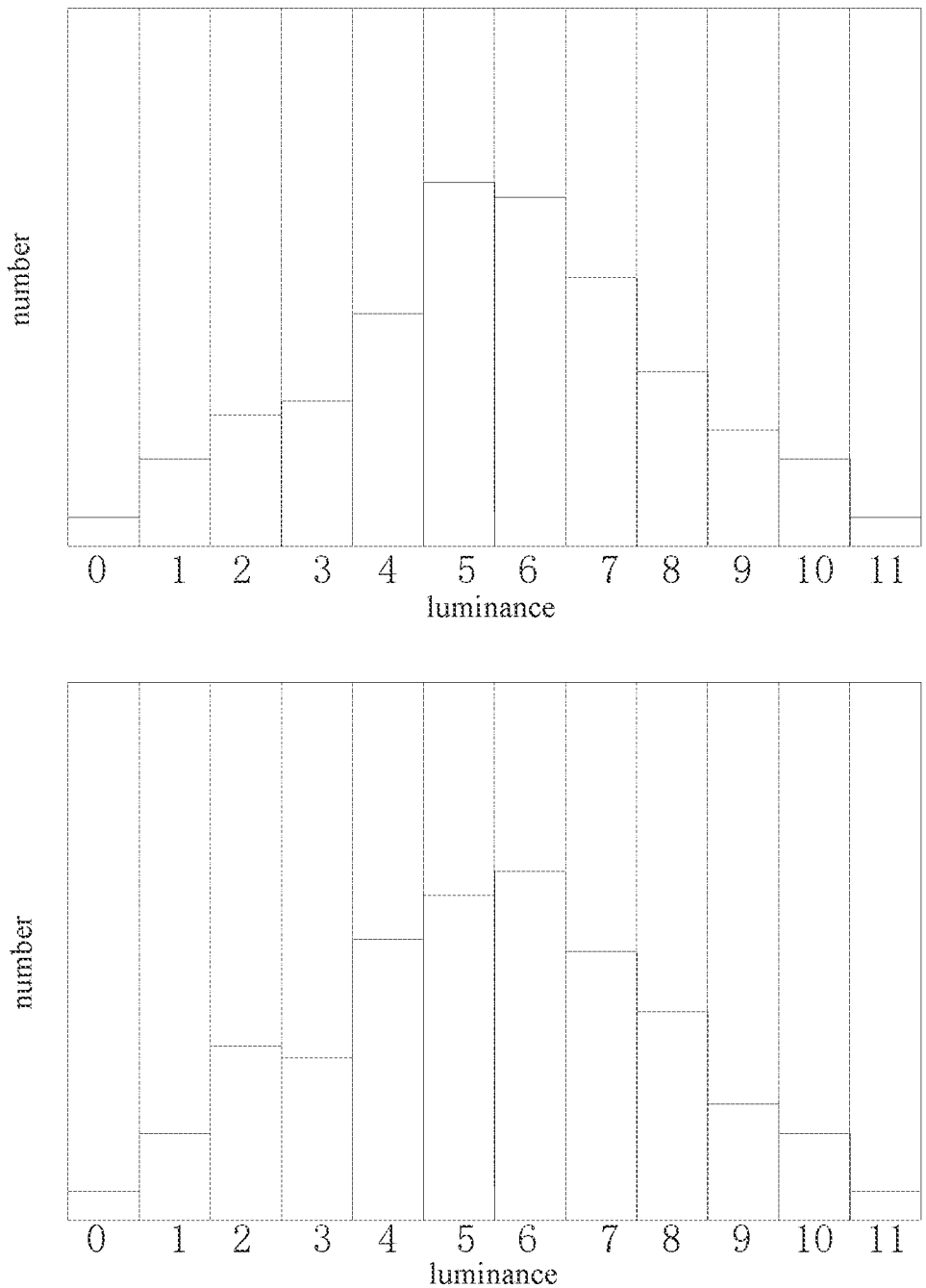
FIG. 6 is a histogram of the distribution of a plurality of first pixels at luminance 0 to 11 and a histogram of the distribution of a plurality of second pixels at luminance 0 to 11 after adjusting the first proportion and the second proportion.

In this manner, the control circuit 120 can update the first proportion and the second proportion so that the subsequent ranging operation yields more balanced results. The statistical histogram of the luminance information LI of each first pixel, as shown in the upper part in FIG. 6, shows that there is no longer overexposure or underexposure of the first signal sampling according to the first proportion and the second proportion adjusted by the control circuit 120, i.e., the highest percentage of pixels with moderate luminance. As shown in the lower part in FIG. 6, the statistical histogram of the luminance information LI of each second pixel shows that the second signal sampling according to the first proportion and second proportion adjusted by the control circuit 120 has also been free of overexposure or underexposure, i.e., the highest percentage of pixels with moderate luminance.

In some embodiments, the control circuitry 120 may update the first proportion and the second proportion in real time according to the depth information DI and the luminance information LI transmitted by the processing circuitry 134. In some embodiments, the control circuitry 120 may also update the first scale and the second scale only once and continue to use them until the end of the distance measuring operation. In addition, in cases where there are more than two types of signals sampled, the scaling of multiple types of signals sampled may be set in the manner described above.

Figure 7:
FIG. 7 is a schematic diagram illustrating the pulse having a phase of 0 degree, 90 degrees, 180 degrees, and 270 degrees.

In some embodiments, as shown in FIG. 7, the pulse generation unit 110 intermittently transmits a plurality of pulses PE with a phase of 0 degree, followed by a plurality of pulses PE with a phase of 90 degrees, followed by a plurality of pulses PE with a phase of 180 degrees, followed by a plurality of pulses PIE with a phase of 270 degrees. Since there are phase differences between the pulses PE of four different phases, i.e., the times that the reflected signal RL arrives at the pixel array 132 may differ inherently, the efficacy will be compromised if the signal sampling configuration method designed for the pulses PE with a phase of 0 degree (such as the optimized first proportion and second proportion obtained for the pulses PE of 0 degree) is applied to the pulses PE with a phase of 90, 180, or 270 degrees. Therefore, in one embodiment of the present application, the signal sampling configuration method will be calculated separately for pulses PE of different phases, such as finding the first proportion and the second proportion according to the aforementioned method for pulses PE with a phase of 90, 180 and 270 degrees, respectively.

The foregoing outlines features of several embodiments of the present application so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alternation herein without departing from the spirit and scope of the present disclosure.

What is claimed is:

1. A time-of-flight (TOF) based distance measuring method, characterized by comprising:

intermittently transmitting a plurality of pulses from a pulse generation unit, wherein the plurality of pulses are reflected by a target to generate a plurality of reflected signals;

controlling a TOF sensor to allow each pixel of a plurality of pixels in the TOF sensor continuously to perform a first signal sampling for a first predetermined time on a first part of the plurality of reflected signals and to perform a second signal sampling for a second predetermined time on a second part of the plurality of reflected signals, wherein the first part of the plurality of reflected signals is reflected from a closer location to the TOF sensor, and the second part of the plurality of reflected signals is reflected from a farther location to the TOF sensor, wherein a starting time point of the first predetermined time and a transmitting time point of the corresponding pulse have a first time difference, and a starting time point of the second predetermined time and a transmitting time point of the corresponding pulse have a second time difference, wherein the first time difference is smaller than the second time difference, the first signal sampling corresponds to a first depth range, and the second signal sampling corresponds to a second depth range;

during each of the first predetermined time and the second predetermined time, using the TOF sensor to sample a first photo response signal outputted by each pixel according to the plurality of reflected signals, so as to generate a plurality of sampling results of the plurality of pixels;

using the TOF sensor to obtain a plurality of depth information and a plurality of luminance information corresponding to the plurality of pixels according to the plurality of sampling results; and adjusting a first number proportion of the plurality of pulses and a second number proportion of the plurality of pulses according to the plurality of depth information and the plurality of luminance information, wherein the first number proportion of the plurality of pulses is corresponding to the first signal sampling and is used to obtain information of the first depth range, and the second number proportion of the plurality of pulses is corresponding to the second signal sampling and is used to obtain information of the second depth range,
wherein the step of adjusting the first number proportion and the second number proportion according to the plurality of depth information and the plurality of luminance information comprises:
classifying the plurality of pixels into a plurality of first pixels and a plurality of second pixels according to the plurality of depth information, wherein depth information of the plurality of first pixels falling in the first depth range and depth information of the plurality of second pixels falling in the second depth range, wherein the plurality of first pixels have a plurality of first luminance information of the plurality of luminance information and the plurality of second pixels have a plurality of second luminance information of the plurality of luminance information; and
adjusting the first number proportion and the second number proportion respectively according to a distribution of the plurality of first luminance information among a plurality of luminance intervals and a distribution of the plurality of second luminance information among the plurality of luminance intervals.

2. The distance measuring method of claim 1, wherein the step of adjusting the first number proportion and the second number proportion comprises:
when a proportion of the plurality of first luminance information that exceeds a first threshold value is greater than a first default value, reducing the first number proportion; and
when a proportion of the plurality of second luminance information that exceeds the first threshold value is greater than the first default value, reducing the second number proportion.

3. The distance measuring method of claim 1, wherein the first predetermined time includes at least one sampling period, and a first one of the at least one sampling period of the first predetermined time is adjacent to the starting time point of the first predetermined time, wherein the second predetermined time includes the at least one sampling period, and a first one of the at least one sampling period of the second predetermined time is adjacent to the starting time point of the second predetermined time, wherein the sampling period has a fixed time length.

4. The distance measuring method of claim 3, wherein a time length of the sampling period is equal to a pulse length of each pulse of the plurality of pulses.

5. The distance measuring method of claim 4, wherein a difference between the second time difference and the first time difference is at least the time length of the sampling period.

6. The distance measuring method of claim 4, wherein the first predetermined time and the second predetermined time include a same number of the sampling periods.

7. The distance measuring method of claim 1, wherein the first depth range does not overlap or partially overlaps with the second depth range.

8. The distance measuring method of claim 1, further comprising:
intermittently transmitting a plurality of delayed pulses from the pulse generation unit, wherein the plurality of delayed pulses are reflected by the target to generate a plurality of delayed reflected signals, and a waveform of the plurality of delayed pulses is different from a waveform of the plurality of pulses; and
controlling the TOF sensor to allow each pixel of the plurality of pixels in the TOF sensor to perform the first signal sampling on a third part of the plurality of delayed reflected signals and perform the second signal sampling on a fourth part of the plurality of delayed reflected signals, wherein the third part of the plurality of reflected signals is reflected from the closer location to the TOF sensor, and the fourth part of the plurality of reflected signals is reflected from the farther location to the TOF sensor, wherein the third part differs from the first part, and the fourth part differs from the second part;
using the TOF sensor to sample a second photo response signal outputted by each pixel according to the plurality of delayed reflected signals, so as to generate a plurality of delayed sampling results of the plurality of pixels;
using the TOF sensor to obtain a plurality of delayed depth information and a plurality of delayed luminance information corresponding to the plurality of pixels according to the plurality of delayed sampling results; and
adjusting a third number proportion of the plurality of delayed pulses and a fourth number proportion of the plurality of delayed pulses according to the plurality of delayed depth information and the plurality of delayed luminance information, wherein the third number proportion of the plurality of delayed pulses is corresponding to the first signal sampling and is used to obtain the information of the first depth range, and the fourth number proportion of the plurality of delayed pulses is corresponding to the second signal sampling and is used to obtain the information of the second depth range.

9. A time-of-flight (TOF) based distance measuring system, characterized by comprising:
a pulse generation unit;
a control circuit, coupled to the pulse generation unit, configured to control the pulse generation unit to intermittently transmit a plurality of pulses, and configured to adjust a first number proportion of the plurality of pulses and a second number proportion of the plurality of pulses according to a plurality of depth information and a plurality of luminance information, wherein the plurality of pulses are reflected by a target to generate a plurality of reflected signals;
a TOF sensor, including a pixel array having a plurality of pixels, wherein the TOF sensor is under control of the control circuit and configured to control each pixel of the plurality of pixels to perform a first signal sampling for a first predetermined time on a first part of the plurality of reflected signals and perform a second signal sampling for a second predetermined time on a second part of the plurality of reflected signals, wherein the first part of the plurality of reflected signals is reflected from a closer location to the TOF sensor, and the second part of the plurality of reflected signals is reflected from a farther location to the TOF sensor, wherein during each of the first predetermined time and the second predetermined time, the TOF sensor samples a first photo response signal outputted by each pixel according to the plurality of reflected signals, so as to generate a plurality of sampling results of the plurality of pixels, wherein a starting time point of the first predetermined time and a transmitting time point of the corresponding pulse have a first time difference, and a starting time point of the second predetermined time and a transmitting time point of the corresponding pulse have a second time difference, wherein the first time difference is smaller than the second time difference, the first signal sampling corresponds to a first depth range, the second signal sampling corresponds to a second depth range, and the TOF sensor obtains the plurality of depth information and the plurality of luminance information corresponding to the plurality of pixels according to the plurality of sampling results, wherein the first number proportion of the plurality of pulses is corresponding to the first signal sampling and is used to obtain information of the first depth range, and the second number proportion of the plurality of pulses is corresponding to the second signal sampling and is used to obtain information of the second depth range, wherein the control circuit is further configured to:
classify the plurality of pixels into a plurality of first pixels and a plurality of second pixels according to the plurality of depth information, wherein depth information of the plurality of first pixels falling in the first depth range and depth information of the plurality of second pixels falling in the second depth rang, wherein the plurality of first pixels have a plurality of first luminance information of the plurality of luminance information and the plurality of second pixels have a plurality of second luminance information of the plurality of luminance information; and adjust the first number proportion and the second number proportion respectively according to a distribution of the plurality of first luminance information among a plurality of luminance intervals and a distribution of the plurality of second luminance information among the plurality of luminance intervals.

10. The distance measuring system of claim 9, wherein the control circuit is further configured to:
when a proportion of the plurality of first luminance information that is lower than a second threshold value is greater than a second default value, increase the first number proportion; and
when a proportion of the plurality of second luminance information that is lower than the second threshold value is greater than the second default value, increase the number second proportion.

11. The distance measuring system of claim 9, wherein the first predetermined time includes at least one sampling period, and a first one of the at least one sampling period of the first predetermined time is adjacent to the starting time point of the first predetermined time, wherein the second predetermined time includes the at least one sampling period, and a first one of the at least one sampling period of the second predetermined time is adjacent to the starting time point of the second predetermined time, wherein the sampling period has a fixed time length.

12. The distance measuring system of claim 11, wherein a time length of the sampling period is equal to a pulse length of each pulse of the plurality of pulses.

13. The distance measuring system of claim 12, wherein a difference between the second time difference and the first time difference is at least the time length of the sampling period.

14. The distance measuring system of claim 12, wherein the first predetermined time and the second predetermined time include a same number of the sampling periods, or a number of the sampling period of the first predetermined time is greater than a number of the sampling period of the second predetermined time.

15. The distance measuring system of claim 9, wherein the first depth range does not overlap or partially overlaps with the second depth range.

16. The distance measuring system of claim 9, wherein the control circuit further controls the pulse generation unit to intermittently transmit a plurality of delayed pulses, and adjusts a third number proportion and a fourth number proportion according to a plurality of delayed depth information and a plurality of delayed luminance information, wherein the plurality of delayed pulses are reflected by the target to generate a plurality of delayed reflected signals, and a waveform of the plurality of delayed pulses is different from a waveform of the plurality of pulses; and the TOF sensor further controls each pixel of the plurality of pixels in the TOF sensor to perform the first signal sampling to a third part of the plurality of delayed reflected signals and perform the second signal sampling to a fourth part of the plurality of delayed reflected signals, wherein the third part of the plurality of reflected signals is reflected from the closer location to the TOF sensor, and the fourth part of the plurality of reflected signals is reflected from the farther location to the TOF sensor, wherein the TOF sensor samples a second photo response signal outputted by each pixel according to the plurality of delayed reflected signals, so as to generate a plurality of delayed sampling results of the plurality of pixels, wherein the third part differs from the first part, and the fourth part differs from the second part; and the TOF sensor obtains the plurality of delayed depth information and the plurality of delayed luminance information corresponding to the plurality of pixels according to the plurality of delayed sampling results.

* * * * *